US008863419B1

(12) United States Patent
Pace et al.

(10) Patent No.: US 8,863,419 B1
(45) Date of Patent: Oct. 21, 2014

(54) DURABLE BANNER AND MOUNTING SYSTEM THEREFOR

(71) Applicants: Tonya Pace, Erie, PA (US); Gary P Schneider, Erie, PA (US)

(72) Inventors: Tonya Pace, Erie, PA (US); Gary P Schneider, Erie, PA (US)

(73) Assignee: Howard Industries, Fairview, PA (US)

( * ) Notice: Subject to any disclaimer, the term of this patent is extended or adjusted under 35 U.S.C. 154(b) by 0 days.

(21) Appl. No.: 13/733,432

(22) Filed: Jan. 3, 2013

(51) Int. Cl.
*G09F 7/22* (2006.01)
*G09F 15/02* (2006.01)
*G09F 7/18* (2006.01)
*G09F 15/00* (2006.01)
*F16M 13/02* (2006.01)

(52) U.S. Cl.
CPC *G09F 7/18* (2013.01); *F16M 13/02* (2013.01); *G09F 15/00* (2013.01)
USPC .... 40/617; 40/607.12; 248/218.4; 248/219.1; 248/219.3

(58) Field of Classification Search
CPC ................................. G09F 7/18; F16M 13/02
USPC ................. 40/617, 607.12; 248/218.4, 219.1, 248/219.3
See application file for complete search history.

(56) References Cited

U.S. PATENT DOCUMENTS

| 1,802,939 | A | * | 4/1931 | Butler | 40/607.12 |
| 4,548,377 | A | * | 10/1985 | Huel | 248/219.1 |
| 5,463,973 | A | * | 11/1995 | Tait | 116/173 |
| 6,216,374 | B1 | * | 4/2001 | Lawrence | 40/604 |
| 7,320,193 | B2 | * | 1/2008 | Kim | 40/607.12 |
| 7,673,409 | B2 | * | 3/2010 | Pitcher et al. | 40/617 |
| 7,810,265 | B2 | * | 10/2010 | Beatty | 40/607.14 |
| 8,500,073 | B2 | * | 8/2013 | Quesnel | 248/74.4 |

* cited by examiner

*Primary Examiner* — Syed A Islam

(57) ABSTRACT

A weather-resistant, tear-resistant banner of polycarbonate material is mounted to a post or pole using a channel member and a bracket system that readily allows changing of seasonal banners. The polycarbonate die-cut banner is suspended along a single edge by the channel member which slides into the bracket. The bracket can be banded to virtually any post or pole regardless of shape or size.

6 Claims, 2 Drawing Sheets

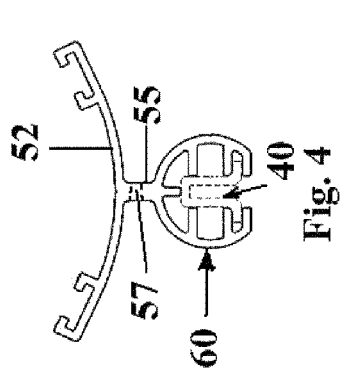
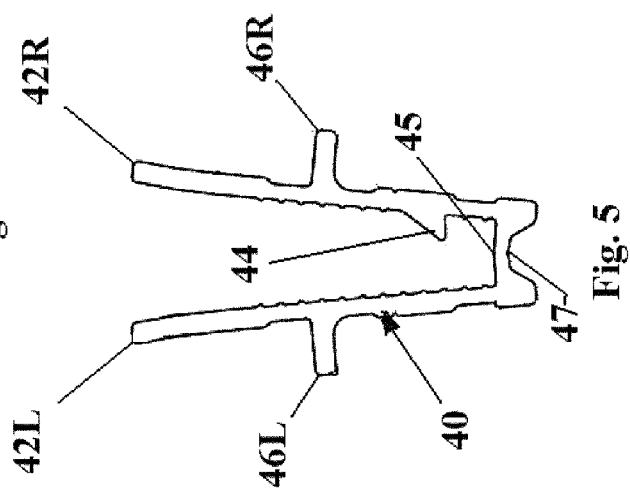
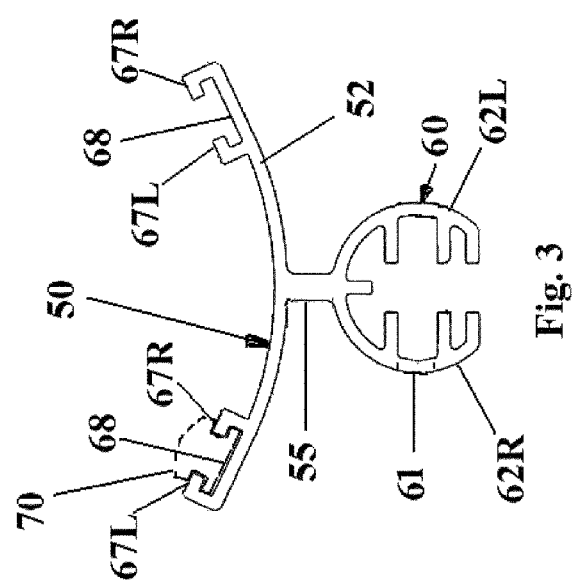

DURABLE BANNER AND MOUNTING SYSTEM THEREFOR

BACKGROUND AND SUMMARY OF THE INVENTION

The present invention is directed to the sign industry. More particularly, the present invention is directed to a weather-resistant, tear-resistant banner with a mounting system permitting it to be readily attached to an existing pole or post.

The sign industry, and particularly, display banners for informational displays which are attached to light poles, stanchions, and the like, has continued to flourish, even in a tight economy. For the most part, these display banners are made of cloth which, over time, deteriorates as a result of sun, rain, and wind tending to fade the images and tatter the edges of the fabric.

The durable banner and mounting system of the present invention, marketed under the name PERMA-BANNER, provides an easy changeable display banner with a 5 year warranty that will not fade, break, rip, tear, fray, or shred. The banner of the present invention comprises a durable tear-proof banner for attachment to a pole comprising a) a die-cut sheet of polycarbonate of sufficient thickness to be tear-resistant and weather-proof; b) channel means for grasping an edge portion of the banner; c) bracket means receiving the channel means and attaching the channel means to the pole suspending the die-cut sheet by the grasped edge portion. The channel means comprises a channel member which grasps the entire length of the edge of the banner and includes a tang positioned near an innermost wall portion of the channel member, the tang engaging in a notch in the edge of the banner retaining the banner in engagement with the channel member. The bracken means comprises i) a first arcuate portion which extends around a portion of the pole; ii) a second truncated spherical member which engages the channel member; iii) a web interconnecting the first arcuate portion and the second truncated spherical member. The channel member has a pair of laterally protruding flanges which are received in recesses in the second truncated spherical member. Bumper means secured to an inner surface of the first arcuate portion for engaging the surface of the pole to which said mounting system is secured and inhibiting the mounting system from rotating and sliding relative to the pole. Preferably, the bumper means slide into a channel created by a pair of C-shaped arms integral to the inner surface of the first arcuate portion.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 3 is an end view of the bracket means of the first embodiment;

FIG. 4 is an end view of the bracket means with the flanges of the channel member ghosted in; and, FIG. 5 is an end view of the channel member prior to its being crimped around the banner.

DETAILED DESCRIPTION OF THE PREFERRED EMBODIMENT(S)

Figure 2:
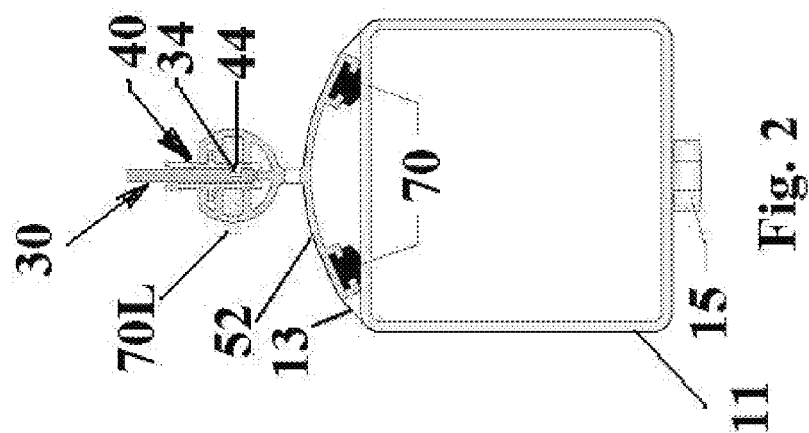
FIG. 2 is a cross-sectional top view of the first embodiment taken along line 2-2 in FIG. 1.
Figure 1:
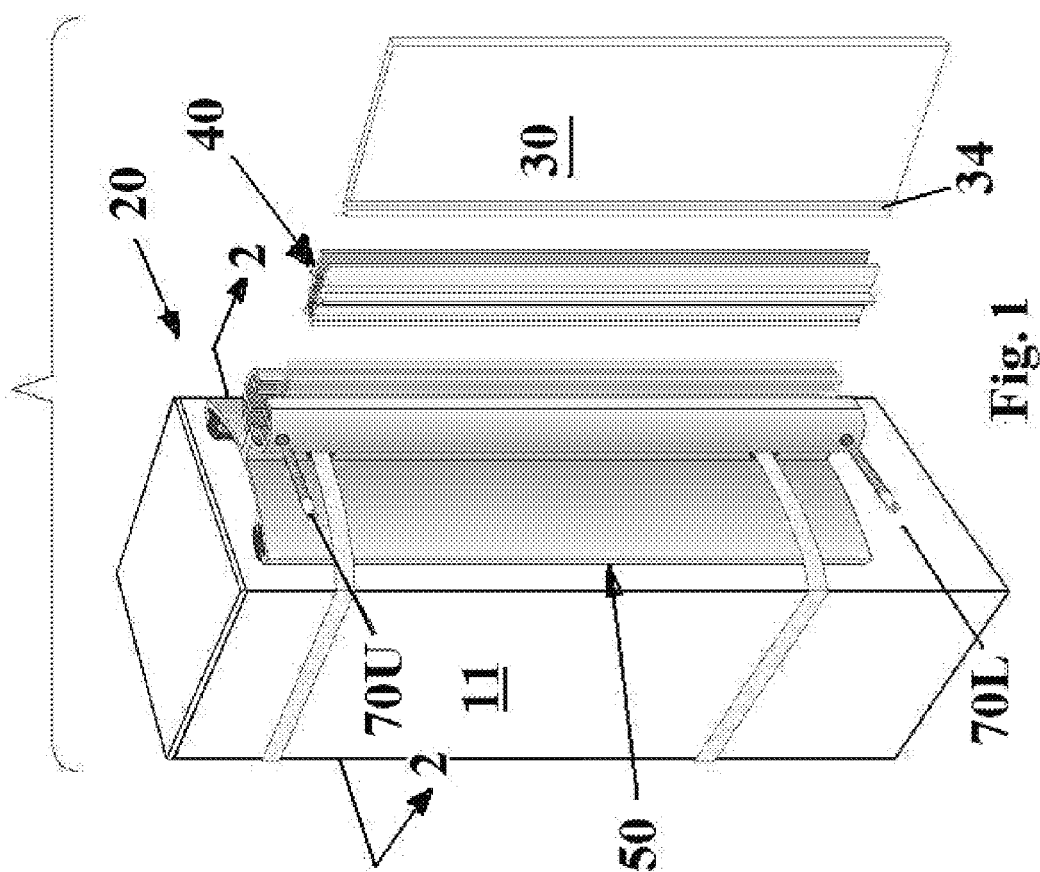
FIG. 1 is an exploded front perspective view of a first embodiment of the banner and mounting system of the present invention shown assembled to a pole.

A first embodiment of the banner and mounting system of the present invention is depicted in FIGS. 1 and 2 generally at 20. As depicted in FIG. 1, banner and mounting system 20 is comprised of three principle elements: banner 30, channel member 40 and bracket means 50. Banner member 30 is a die-cut polycarbonate having a thickness of ³⁄₁₆", a width of up to 30" and any length up to 100". While the prior art depicts polycarbonate being used in thin sheets for backlit signs, no one has previously used thick sheets of polycarbonate material to form a die-cut sign that is supported by a single edge. Banner 30 may have any shape desired and will not fade, break, rip, tear, fray, or shred. In fact, the manufacturer warrants banner 30 for 7 years against any such deterioration.

While the banner mounting system 20 is depicted in FIG. 1 used with a square post to reflect its versatility, it will be appreciated that the banner mounting system 20 can be utilized most effectively with round poles from 3"-8" in diameter. Both channel member 40 and bracket means 50 are manufactured of extruded aluminum and may be powder coated in black or white to afford whatever color scheme the user desires to complement or contrast with the colors in banner 30 or post 11, for example.

Bracket means 50 includes first arcuate portion 52 which extends partially around a portion of the pole 11 (FIGS. 1 and 2); ii) a second truncated spherical member 60 which engages channel member 40; and, iii) a web 55 interconnecting first arcuate portion 52 and second truncated spherical member 60 (FIG. 3). Channel member 40 includes a pair of diverging arms 42R and 42L (FIG. 5) which embrace edge portion 32 of banner 30. Tang 44 positioned near an innermost wall portion 45 of channel member 40 engages in notch 34 in the edge 35 of the banner retaining the banner 30 in engagement with channel member 40 (FIG. 2). When the banner 30 is positioned between diverging arms 42R and 42L, those arms are pinched into a parallel configuration that clamps edge 35 of banner 30. Channel member 40 has a pair of laterally protruding flanges 46R and 46L which are received in recesses 64 in bracket means 50. Arms 62R and 62L of truncated spherical portion 65 surround portions of arms 42R and 42L of channel member 40. Protruding finger 66 in the base of truncated spherical member 60 is received in an orienting notch 47 on the outside of innermost wall portion 45 of channel member 40 limiting the amount of lateral movement of channel member 40 in bracket means 50. A pair of elastomeric bumper means 70 are slid into channels 68 each formed by two C-shaped arms 67R and 67L formed integrally with internal surface 65 of arcuate portion 52. The bumper means 70 resist rotational and translational sliding of bracket means 50 relative to pole 11.

A plurality of openings 57 (two shown, more will be implemented with longer banners 30) are provided in web 50 to allow banding straps 13 to secure bracket means 50 to pole 11. Ends of straps 13 are tensioned and secured by clasp 15. A pair of retention set screws 70U and 70L are threaded through holes 61 in the truncated spherical member 60 to retain channel member 40 in bracket means 60. It will be appreciated that screws 70U and 70L bracket channel member 40 and do not penetrate it to allow easy removal and replacement of banner 30 and channel member 40 by simply removing one of screws 70U or 70L and sliding the banner 30, and channel member 40 engaging it, out of bracket means 50. This is especially beneficial for changing seasonal display banners, as necessitated by transitioning of the times of the year.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A mounting system for securing a rigid banner to a pole, the banner having a given length defined by two lateral edges and a given width defined by an upper edge and a lower edge, said mounting system comprising:
   a) bracket means receiving a channel means and attaching said channel means to the pole, said bracket means comprising
      i) a first actuate portion which extends in a first direction around a portion of the pole;
      ii) a second truncated spherical member which extends is a second opposite direction and engages said channel member;
      iii) a web interconnecting said first actuate portion and said second truncated spherical member;
   b) channel means for grasping a first lateral edge portion of the banner, said channel means sliding axially into said truncated spherical member of said bracket means and being prevented from axial movement by first and second set screws extending laterally through at least a portion of said truncated spherical member above and below said channel member thereby engaging upper and lower edges of said channel member without penetrating any portion of said channel member.

2. The mounting system of claim 1 wherein said channel means comprises a channel member which grasps the entire length of the edge of the banner.

3. The mounting system of claim 2 further comprising a tang positioned near an innermost wall portion of said channel member, said tang engaging in a notch in the edge of the banner retaining the banner in engagement with said channel member.

4. The mounting system of claim 3 wherein said channel member has a pair of laterally protruding flanges which are received in recesses in said second truncated spherical member.

5. The mounting system of claim 1 further comprising openings in said web, said openings accommodating straps which fasten said bracket means to the pole.

6. The mounting system of claim 1 further comprising elastomeric bumper means secured to an inner surface of said first arcuate portion for engaging the surface of the pole to which said mounting system is secured and inhibiting said mounting system from rotating and sliding relative to the pole.

* * * * *